April 28, 1936.  LE ROY M. DEARING  2,038,546
METHOD AND APPARATUS FOR DISTILLATION AND EXTRACTION
Filed Dec. 31, 1931    2 Sheets-Sheet 2

INVENTOR
Le Roy M. Dearing
BY HIS ATTORNEYS
Newell & Spencer

Patented Apr. 28, 1936

2,038,546

UNITED STATES PATENT OFFICE 2,038,546

METHOD AND APPARATUS FOR DISTILLATION AND EXTRACTION

Le Roy M. Dearing, Yellow Springs, Ohio, assignor to Antioch Industrial Research Institute, Inc., Yellow Springs, Ohio, a corporation of Ohio Application December 31, 1931, Serial No. 584,056

5 Claims. (Cl. 230—208)

This invention relates to methods of distillation and extraction, and to apparatus adapted for use in such distillation and extraction. More particularly, the invention relates to methods and apparatus adapted to produce a continuous closed cycle extraction and separation of solvent from the dissolved material, and especially to such treatment where a number of different solvents are used successively with substantially complete removal of one solvent before the introduction of the next, and without disturbing the material being extracted, and particularly without opening to the atmosphere the part of the apparatus in which such material is contained.

The method and apparatus of the present invention are particularly adapted for the separation by extraction of materials which are more or less unstable in the presence of air, or which would be readily decomposed by heating. Particularly in the extraction of such materials as vitamins, glandular extracts, etc., will the apparatus of my invention prove of greatest value. Accordingly, it is an object of the invention to provide a method and apparatus which will permit continuous and repeated extraction with a solvent, and continuous separation of the solvent from the dissolved matter, whereby to permit its re-use in the cycle without exposure of the material to the atmosphere, or heating of the material to a temperature which would cause objectionable decomposition.

Figure 1:
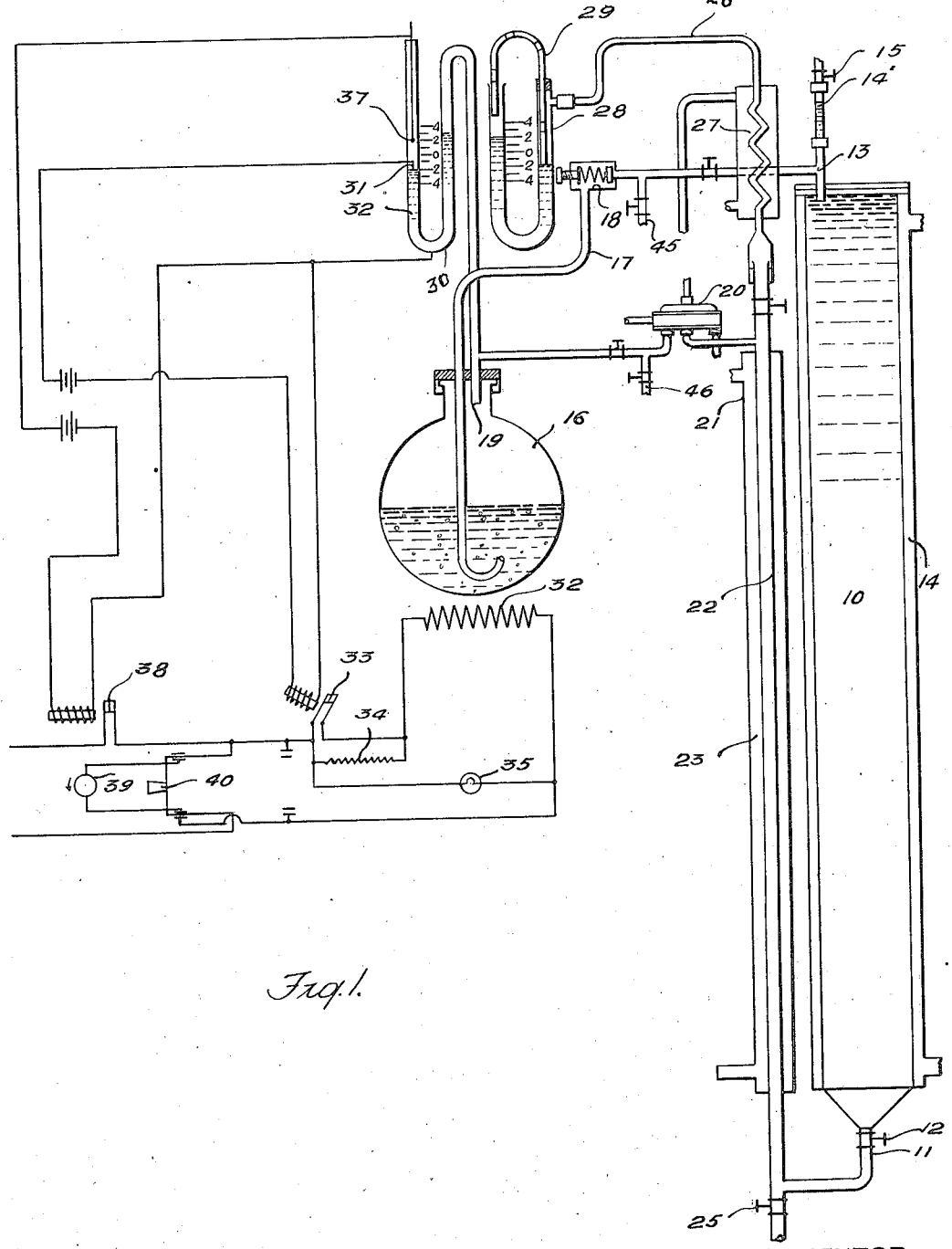

In the drawings which are for the purpose of illustration only, Fig. 1 is a diagrammatic view illustrating a preferred form of the apparatus.

Figure 2:
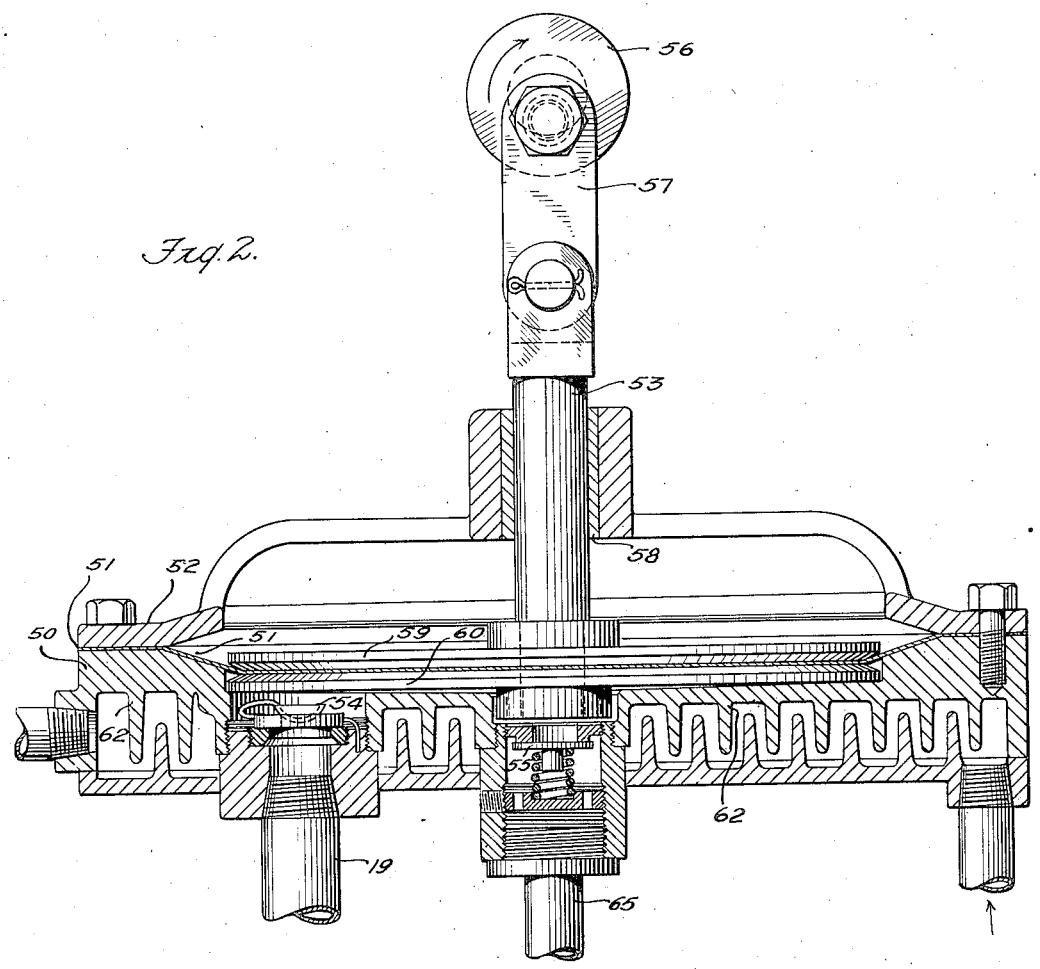

Fig. 2 is a view in vertical section of the vacuum pump which I prefer to use in connection with the apparatus shown in Fig. 1.

Referring first to Fig. 1, I have shown an extraction chamber 10 having an inlet 11 controlled by a valve 12 and an outlet 13. A heating jacket 14 preferably surrounds this extraction chamber. Above the outlet 13, and open thereto, is a sight glass 14', which serves both to show the color of the solution resulting from the extraction process, and to show if air should collect in the top of the extraction chamber. A relief valve 15 is provided above the sight glass for the purpose of venting air, or other gases if it should collect in the sight glass. The outlet 13 is connected to a boiler 16 by means of the conduit pipe 17. An adjustable pressure-operated check valve 18 serves to maintain the pressure in the extraction chamber at any desired value above that of the vacuum boiler. In the preferred form of the invention, as shown, the conduit 17 terminates below the level of the liquid in the boiler 16, so as to prevent the formation of spray which otherwise might result from rapid boiling of the solution as it is emitted from the conduit 17. A suitable heating means may be provided, if desired, for example, an electrical resistance heater, as shown diagrammatically at 32, and this heating means is preferably automatically controlled, either by the pressure or by the temperature in the boiler 16, as will be hereinafter described.

An outlet pipe or conduit 19 connects the vapor space above the liquid in the boiler 16 with a pump 20, which serves to maintain a pressure in the boiler 16 sufficiently low to effect distillation at a temperature below that at which the dissolved material would objectionably decompose, and to raise the pressure of the vapors withdrawn from the boiler 16 to that at which the extraction is performed.

The condenser 21, which in the present case is shown diagrammatically, has merely a vertical pipe 22 surrounded by a water jacket 23, and is preferably provided to condense the compressed vapors from the pump 20. In the closed cycle operation of the apparatus, the condenser is connected to the extraction tank 10 by means of the return pipe 11, but by means of the valved connection 25, the liquid solvent from the condenser 21 may be discharged from the system and e. g., run to suitable storage tanks.

The top of the condenser pipe 22 is, in the present embodiment, connected to an automatic air vent apparatus by means of the connection 26. Preferably, as shown at 27, this connection includes a supplemental condenser, so that uncondensed vapors from the pump 20 will not be vented through the connection 26. The end of the connection 26 is open into the closed side of the U-tube manometer 28. As shown, a smaller inverted U-tube 29 is positioned with one leg in the closed end of the manometer tube 28, and with its end below the normal surface of the mercury in said tube. The other is open to the atmosphere, but as shown is preferably within the opposite leg of the manometer tube so that any mercury which may be carried over in the tube will be discharged back into the manometer.

A second manometer 30 is shown connected to the outlet pipe 19, and in the open end of the manometer 30 is positioned a suitable electrode 31 adapted to control the heating circuit. In the embodiment shown in the drawings, this is controlled by means of the relay 33 in the main heating circuit by which the resistance heater 18 is energized. The opening of the relay 33 necessitates the passage of the current through the resistance 34, and consequently reduces the heating at 18, whereas the closing of the relay 33 shunts out the resistance 34, and increases the heating. A lamp 35 is lighted whenever the heater 18 is energized, and thereby serves as an annunciator to apprise the operator of this fact. Above the electrode 31 in the manometer 30, is a second electrode 37. When the pressure in the boiler 16 so far increases as to close a circuit through the electrode 37, the relay 38 is operated to open the main line circuit and thereby to shut off both the motor 39 by which the pump 20 is operated and the heater 18.

In Fig. 1, I have shown the contacts 31 and 37 diagrammatically and, to avoid confusing them, I have indicated 31 as entering through the side of the manometer tube. In practice, however, if either is to be sealed in through the tube, it should be the contact 37 which controls the maximum pressure. The contact 31 should preferably be adjustable to the various pressures at which different solutions will be boiled in the apparatus, and preferably both contacts 31 and 37 are extended into the tube 32 from its open end so as to be freely adjustable therein. In the present instance, a switch shown as a knife switch 40 is provided, by which the motor 39 may be cut out without breaking the circuit at the heater 32.

In the operation of the device as just described, the extraction chamber 10 is first filled with the raw material, and is then closed and sealed. A suitable solvent is then run in, either through the valve 25 or through the connections 45 and 46, until the extraction chamber, the pipe 17 and the bottom of the boiler 16 are filled with the solvent.

During the filling of the extraction chamber and the outlet pipe 13, the valve 15 may be left open to vent air from the chamber. The heater and motor circuits may now be closed, or the heater circuit may first be closed to bring the solvent in the boiler 16 substantially to the desired boiling temperature before the pump 20 is started. With the pump 20 and the heater 32 operating, the check valve 18 is adjusted to maintain a desired pressure difference between the extraction pump 10 and the boiler 16. These pressures are respectively shown by the manometers 28 and 30. The inverted U-tube 29 should also be adjusted in the manometer 28 so that its end is just below the level of the mercury with all air vented from the apparatus. The electrodes 31 and 37 are positioned or adjusted in the manometer 30 to the desired and the maximum pressures respectively.

With the apparatus thus adjusted with the valves 15 and 25 closed, and the valve 12 opened, the extraction continues automatically, and for any desired length of time. The solvent, after passing through the raw material in the extraction chamber 10, runs out through the outlet pipe 13 through the check valve 18 and the conduit 17 into the boiler 16. At the same time, some of this solution passes by diffusion into the sight glass 14' and any bubbles of entrained air tend also to rise and collect in the top of the sight glass 14.

In the boiler 16, the solvent is evaporated from the solution and the resulting vapor is drawn into the pump 20 and compressed to or slightly above the pressure of the extraction treatment. From the pump, the compressed and/or condensed vapors pass into the pipe 22 which preferably, as shown, is also a condenser, and from there return through the connection 11 to the inlet end of the extraction chamber 10. If any air or other gases leak into the vacuum part of the system, they will collect in the top of the pipe 22 and, after passing through the supplemental condenser 27, where any solvent vapors will be condensed, these fixed gases will collect in the vent pipe 26. So long as these gases are confined to the vent pipe 26, the mercury will cover the end of the inverted U-tube 29, and thereby will prevent the escape of these gases. If, however, additional gas collects in the pipe 22, so as to force down the level in this pipe, the head of liquid in the chamber 10 over that in the pipe 22 will produce an increased pressure upon this gas, and thereby will serve to lower the level of the mercury in the closed leg of the manometer tube 28. This, in turn, will expose the end of the inverted U-tube 29 and will permit the escape of gases through the tube 29 into the open end of the manometer tube 28, and from thence into the atmosphere. If any mercury should be carried over in the tube 29, this will be discharged onto the surface of the mercury in the open leg of the manometer 28 and the operation of the manometer, therefore, will not be affected.

If the heating of the boiler 16, e. g., by means of the heater 18 causes a greater vaporization than can be cared for by the pump 20, the pressure in the boiler 16 will increase and the level in the open end of the manometer tube 30 will thereby be raised until the mercury in the tube contacts with the electrode 31. Thereupon the circuit of the relay 33 will be closed and the contacts of this relay will be opened. The shunt portion of the heater circuit 18 having been thus opened, the current is required to pass through the resistance 34, and thereby the heating of the boiler 16 is reduced until such time as the pressure in the boiler has decreased sufficiently to break the circuit through the electrode 31, and thereby once more to permit the closing of the contacts of the relay 33, and to shunt out the resistance 34. If this reduction of the heating current should not prove sufficient to prevent further increase in the pressure, as for example in case of an obstruction in the extraction chamber, or in any of the connections, the pressure will cause a further rise in the level of the mercury in the manometer until the circuit is closed through the electrode 37, whereupon the contacts of the relay 38 will be opened and both the heater 18 and the motor 39 of the pump 20 will be permanently cut off until the circuit is manually closed after the operator has removed the obstruction, or otherwise adjusted the apparatus to avoid the abnormal condition.

Instead of the arrangement as described above, the contacts 33 and 38 may be designed and arranged to be held closed by the energizing of their respective relay windings and in such case the relative position of the contacts 31 and 37 in the tube 32 will be reversed.

When the extraction is substantially complete, as may be determined, for example, by the color of the solution, which appears in the sight glass 14', the solvents may be drained from the extraction chamber 10 through the inlet connection 11, and through the open valve 25. A suitable heating fluid may be passed through the jacket 14 to facilitate the removal of residual liquid in

10. When the supernatant liquid has drained from the chamber 10, the valve 12 may be closed, and the pump 20 again operated either with or without operation of the heater 32. Preferably, also, the check valve 18 is open, or a suitable bypass connection from the outlet 13 to the pump 20 is opened and the pump 20 is set in operation while the chamber 10 is heated by means of a heating fluid in the jacket 14. This operation is continued until the solvent is substantially entirely evaporated from the material in the chamber 10 and has been discharged from the system through the pump 20, the condenser 21 and the valve 25.

The solution may be drained from the vacuum boiler 16, or if, as shown in the drawings, this boiler is in the form of a removable flask, it may be separated from the apparatus and replaced by another similar boiler and the boiler, with its solution, subjected to any desired subsequent treatment for the recovery of the dissolved material. It is, however, an advantage of the apparatus as described, that the concentration of the solution or complete evaporation of the solvent may be effected in this same apparatus before the boiler 16 is removed. Thus in the preferred operation the valve 70 is closed, after the solvent has been evaporated from the chamber 10, and the operation of the vacuum pump is continued until the desired amount of the solvent has been distilled over from the boiler 16 through the connection 25 to a suitable receiver. During this final distillation operation, it may be necessary to produce an increased evacuation or a slightly higher temperature, or both.

Thereafter, another different solvent may be introduced, and the operation repeated, as already described. In this way, different constituents of the material may be removed by solution in selective solvents successively applied and without removing the material from the extracting chamber or substantially altering the apparatus.

As will be readily appreciated, the operation as above described may be carried on with substantially no loss of solvent, and with automatic control throughout.

As has been already suggested above, the heating of the boiler 16 may be controlled by the temperature of the solution, and this will be particularly desirable where the solution is evaporated at a temperature near that at which the dissolved material tends to decompose. In this case, the pump may be controlled by pressure, or may be operated continuously with pressure control only by the check valve 18 and the heat control as described. Furthermore, the heating obviously may be controlled in other ways. For example, instead of using direct control, as in the resistance heater, the circuit control by the relay 33 may operate drafts, valves, etc., for controlling steam, gas, oil, or any other source of heat.

In Fig. 2 is shown, on an enlarged scale, a vertical section through the pump 20. As shown herein, the preferred form of pump consists of a water jacketed base 50, a diaphragm 51, a cover frame 52, an operating rod 53 and suitable valves 54 and 55.

The rod 53 is driven from an eccentric 56 connected to the shaft of the motor 39 through connecting link 57, and a bearing 58 serves to hold the rod 53 in a properly aligned position.

The discs 59 and 60 connected to the rod 53 clamp between them the central diaphragm 51, while the edges of the diaphragm are clamped between the cover frame 52 and the base 50.

Within this clamping periphery, the base 50 is resisted, as shown, so as approximately to fit against the diaphragm 51 and the plate 60, as shown in Fig. 2. The diaphragm 51 may be of any of a number of flexible materials, but I have found that for many purposes a closely woven cotton fabric impregnated with an insoluble resin such as the well known phenol formaldehyde condensation products is most advantageous.

In order to secure a maximum cooling of the base 50, baffles or grids 62 are provided in the cooling jacket. In the operation of this device, the rod 53 is reciprocated vertically, thereby moving up and down the discs 59 and 60, and flexing back and forth the diaphragm 51. This operation results, as is well known in connection with many types of diaphragm pumps, in an intake and exhaust of gases from the intake pipe 19 and into the exhaust pipe 65. Since, however, the vapor drawn through the intake pipe 19 is substantially at its boiling point for the intake pressure, there is a tendency for the vapor to condense by reason of the increased pressure during the exhaust stroke of the piston. If this condensed liquid were allowed merely to remain on the surfaces of the pump chamber, there would be a tendency for it to re-evaporate with the decrease of pressure during the subsequent intake stroke, and thereby seriously to reduce the efficiency of the pump. Since, however, the base 50 is cooled by means of a suitable fluid through the cooling jacket, the condensed liquid is cooled sufficiently below its boiling point to substantially prevent its re-evaporation, and by virtue of the slope given to the surface of the base 50 within the pump chamber, the condensed liquid is quickly swept into the outlet.

During the intake stroke of the pump, the incoming vapors are partially condensed by contact with the cooled pump walls, so that the volume of gas drawn in is greater than the displacement of the pump. The pressure stroke serves to condense more of the vapor remaining in the pump chamber by increasing the boiling point of the solvent and finally forces the liquid and uncondensed vapor or gas into the condenser.

With the arrangement shown in Fig. 1, the compression stroke of the pump forces the vapors and condensed liquid into the condenser, thereby creating a pressure above that at which the solution passes through the check valve 18 from the pressure side into the vacuum, and thereby forcing some liquid over from the extraction chamber into the boiler. During the subsequent intake stroke of the pump, the vapors which had been forced into the condenser by the preceding compression stroke are being cooled and condensed, so that when the following compression stroke begins, the pressure in the condenser will have been appreciably reduced and a more efficient exhaust from the pump to the condenser will result.

The phrase "hermetically sealed" is used herein in its broad sense to describe a gas-tight condition, whether that condition is achieved by welding, or otherwise.

Although in the above I have described a preferred embodiment of my invention and various modifications thereof, it is to be understood that many changes may be made within the scope of my invention, and that especially may each of the apparatus units which combine to form the apparatus of my invention be varied and adapted to the conditions of each particular operation.

What I claim is:

1. The method of recovering and condensing vapors, which comprises drawing them into a compression space sealed from the atmosphere compressing the vapors therein, and, during at least a part of the processes of drawing in and compressing said vapors, cooling the vapors to effect substantial condensation thereof and discharging the compressed vapors from the compression space so that in their travel they tend to sweep the condensate with them therefrom.

2. The method of recovering and condensing vapors which are near their saturation temperature, which comprises drawing them into a compression space, compressing them, discharging them under compression from said space, cooling at least a part of the walls of said space sufficiently so that condensation of the vapors will occur thereon during compression and the resulting condensate will be cooled below the boiling point at the intake pressure.

3. The method of treating vapors of a material which comprises sucking them into a compression space, condensing at least a part of said vapors in said space during said sucking-in step, depositing the resulting condensate upon a confining surface of said space, maintaining said surface at a temperature below the condensation point of said vapors before compression, compressing said vapors therein and expelling the material therefrom at increased pressure.

4. In a condensing apparatus, a reciprocating diaphragm pump for compressing vapors at approximately their condensation point, said pump being vertically arranged and comprising a pump chamber having inlet and outlet ports, an upper wall for said chamber consisting of a flexible diaphragm, a lower wall for said chamber carrying said ports and means comprising a chamber within said lower wall for circulation of a cooling fluid.

5. The combination as defined in claim 4, in which there is provided an outlet positioned centrally in the lower wall and in which the said lower wall is dished so as to slope from all directions toward the outlet.

LE ROY M. DEARING.